(12) United States Patent
Schiemann

(10) Patent No.: US 10,322,775 B2
(45) Date of Patent: Jun. 18, 2019

(54) REMOTE-CONTROLLED UNDERWATER VEHICLE FOR SUCTION OF OIL FROM THE UNDERSIDE OF AN ICE SURFACE

(71) Applicants: THYSSENKRUPP MARINE SYSTEMS GMBH, Kiel (DE); thyssenkrupp AG, Essen (DE)

(72) Inventor: Marc Schiemann, Kiel (DE)

(73) Assignees: THYSSENKRUPP MARINE SYSTEMS GMBH, Kiel (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/071,799

(22) PCT Filed: Jan. 26, 2017

(86) PCT No.: PCT/EP2017/051644
§ 371 (c)(1),
(2) Date: Jul. 20, 2018

(87) PCT Pub. No.: WO2017/129680
PCT Pub. Date: Aug. 3, 2017

(65) Prior Publication Data
US 2019/0047666 A1    Feb. 14, 2019

(30) Foreign Application Priority Data

Jan. 26, 2016    (DE) .................... 10 2016 201 102

(51) Int. Cl.
*E02B 15/04*    (2006.01)
*B63B 35/32*    (2006.01)
*B63G 8/00*    (2006.01)

(52) U.S. Cl.
CPC ............. *B63B 35/32* (2013.01); *B63G 8/001* (2013.01); *E02B 15/04* (2013.01); *E02B 15/046* (2013.01);
(Continued)

(58) Field of Classification Search
CPC ........ E02B 15/02; E02B 15/04; E02B 15/046; B63B 35/32; B63G 8/001; B63G 2008/005; B63G 2008/007
(Continued)

(56) References Cited

U.S. PATENT DOCUMENTS 4,431,339 A * 2/1984 Bickham ............. E02B 15/0814
210/923
5,532,679 A * 7/1996 Baxter, Jr. ............... E02B 15/04
210/242.3
(Continued)

FOREIGN PATENT DOCUMENTS

DE    102010035899 A    3/2012
EP          2489588 A    8/2012
(Continued)

OTHER PUBLICATIONS

English Translation of International Search Report issued in PCT/EP2017/051644, dated Apr. 10, 2017 (dated Apr. 20, 2017).
Alan A. Allen, "Containment and Recovery of Oil under Arctic Conditions", (Accessed Nov. 3, 2015).

*Primary Examiner* — Christopher Upton
(74) *Attorney, Agent, or Firm* — thyssenkrupp North America, Inc.

(57) ABSTRACT

A remote-controlled underwater vehicle may be used to extract oil from an underside of a closed ice cover. Further, a system for extracting oil from an underside of a closed ice cover may comprise such a remote-controlled underwater vehicle and a submarine that can receive the remote-controlled underwater vehicle and store oil retrieved by the remote-controlled underwater vehicle. Finally, a method can be employed to extract oil from an underside of a closed ice cover.

17 Claims, 4 Drawing Sheets

(52) U.S. Cl.
CPC .. *B63G 2008/005* (2013.01); *B63G 2008/007* (2013.01); *Y02A 20/204* (2018.01)

(58) Field of Classification Search
USPC ........ 210/747.5, 747.6, 776, 170.05, 170.09, 210/170.11, 242.1, 242.3, 923; 114/313, 114/322
See application file for complete search history.

(56) References Cited

U.S. PATENT DOCUMENTS

| | | | |
|---|---|---|---|
| 6,432,304 B1 * | 8/2002 | Nguyen | B63B 13/02 |
| | | | 210/242.1 |
| 2008/0135494 A1 | 6/2008 | Usher | |
| 2009/0045118 A1 * | 2/2009 | de Strulle | E02B 15/043 |
| | | | 210/923 |
| 2014/0116318 A1 * | 5/2014 | Brandt | E02B 15/046 |
| | | | 114/312 |
| 2014/0183145 A1 | 7/2014 | Derenoncourt | |
| 2014/0319076 A1 | 10/2014 | Galushko | |
| 2016/0186399 A1 * | 6/2016 | Muhonen | E02B 15/02 |
| | | | 210/776 |

FOREIGN PATENT DOCUMENTS

| | | |
|---|---|---|
| GB | 2250450 A | 6/1992 |
| WO | 2012168334 A | 12/2012 |
| WO | 2015018976 A | 2/2015 |

\* cited by examiner

REMOTE-CONTROLLED UNDERWATER VEHICLE FOR SUCTION OF OIL FROM THE UNDERSIDE OF AN ICE SURFACE

CROSS REFERENCE TO RELATED APPLICATIONS

This application is a U.S. National Stage Entry of International Patent Application Serial Number PCT/EP2017/051644, filed Jan. 26, 2017, which claims priority to German Patent Application No. DE 10 2016 201 102.2, filed Jan. 26, 2016, the entire contents of both of which are incorporated herein by reference.

FIELD

The present disclosure generally relates to underwater oil extraction, including remote-controlled underwater vehicles for extracting oil from the underside of ice surfaces.

BACKGROUND

The exploitation of oil fields even under the arctic ice is becoming of increasing economic interest. However, one major problem in maritime oil production has to do with the danger of accidents. For this reason, methods are developed for removing oil from maritime systems.

Known from US 2008/0135494 A1 is an apparatus having a unit that operates underwater and a surface vessel.

However, extraction from a surface vessel is not possible under a closed ice cover. In addition, the oil normally rises, and thus accumulates directly under the ice cover. In case of an accident, efforts are nowadays thus made to get at the oil through boreholes or cuts in the ice, so as extract or bind it. However, this is expensive, slow and unable to completely reach the oil under the ice cover.

Known from WO 2012/168334 A1 is a submarine for fighting oil pollution. For example, the latter can have a trunk as part of an oil extraction device.

However, it was shown that a submarine is in itself too big to extract oil that has accumulated on the underside of ice. In addition, the submarine is itself exposed to danger given the often very irregular surface of the ice. This holds true in particular since oil can only be precisely detected at a comparatively small distance.

Thus a need exists for a device for reliably reaching, locating and extracting oil that has accumulated on the underside of ice.

DETAILED DESCRIPTION

Figure 1:
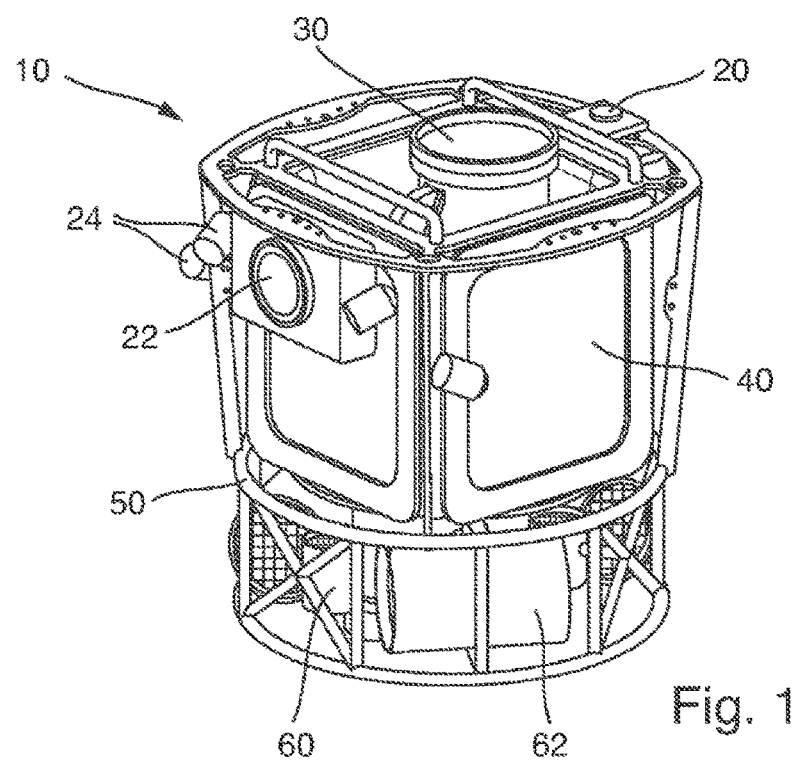
FIG. 1 is a perspective view of an example remote-controlled underwater vehicle.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a remote-controlled underwater vehicle for extracting oil from the underside of a closed ice cover, a system for extracting oil from the underside of a closed ice cover comprising a remote-controlled underwater vehicle and a submarine, as well a method for extracting oil from the underside of a closed ice cover.

The remote-controlled underwater vehicle according to the invention for extracting oil from the underside of a closed ice cover has drive means, at least one pump, at least one means for locating oil, as well as a means for connection to a parent ship. The pump is designed to extract fluid. The connection means has at least one first connection for communication, a second connection for supplying power to the remote-controlled underwater vehicle, and a third connection for conveying extracted fluid to the parent ship. The remote-controlled underwater vehicle further has at least one first floatation panel, wherein the remote-controlled underwater vehicle has water buoyancy.

Within the meaning of this invention, a fluid includes, in particular, all water-oil mixtures, as well as water and oil, wherein these can also contain solid or highly viscous constituents. Apart from constituents of oil and their decomposition or reaction products, these can also include plankton and/or particles suspended, which occur naturally in seawater. Within the meaning of the invention, oil includes all petrochemical raw, intermediate and end products, for example crude oil, diesel or lubricating oil.

This buoyancy automatically drives the remote-controlled water vehicle upward without any active drive, so that it approaches the underside of an ice cover on its own. The remote-controlled water vehicle can be actively kept suspended against this buoyancy by means of the drive means, by virtue of the drive means generating an equal downward thrust. As a result, the remote-controlled water vehicle can be securely positioned under the ice cover.

In particular, the buoyancy is slight, for example ranging from 0.05 to 0.1 m/s. This slight buoyancy can be set by securing suitable floatation panels to the water vehicle. The advantage to a low buoyancy is that the water vehicle floats on its own and can be easily secured given a malfunction, while the drive means do not require a lot of power for generating a downward thrust. At the same time, the water vehicle does not have to actively generate a buoyancy, making it possible to economize on power for the drive system.

The second connection to the power supply makes it possible to supply power to the remote-controlled underwater vehicle. As a result, the remote-controlled underwater vehicle does not require its own means for storing and/or generating power, and can thus be given a compact and movable design. This facilitates navigation under an ice cover, which is routinely highly structured.

In another embodiment of the invention, the means for locating oil is selected from the group consisting of sonar, multibeam sonar, acoustic Doppler current profiler, infrared spectrometer, visual camera, gas chromatograph and mass spectrometer.

The various locating means have very different ranges and accuracies of determining oil contamination. For example, the acoustic Doppler current profiler can be used to locate gas bubbles or oil droplets at a distance of about 700 m. The multibeam sonar enables a precise detection at about 30 m.

Infrared spectrometers and mass spectrometers permit an exact identification, but only have a very slight to no range (sample in or on vehicle).

The remote-controlled water vehicle especially preferably has a multibeam sonar. The multibeam sonar is further preferably pivotable. This especially optimally permits navigation at close range via the remote-controlled water vehicle.

When using a visual camera, the remote-controlled water vehicle preferably has lamps, for example at least one headlamp.

In another embodiment of the invention, the remote-controlled underwater vehicle has at least one first means for locating oil and at least one second means for locating oil, wherein the first means for locating oil and the second means for locating oil are different. For example, the remote-controlled underwater vehicle has a visual camera and a multibeam sonar.

In another embodiment of the invention, the pump or intake port of the pump is arranged on the upper side of the remote-controlled water vehicle. Since the remote-controlled water vehicle is designed to extract oil from the underside of a closed ice cover, it is used to absorb oil, which is specifically lighter than water and thus accumulates directly under the ice. For this reason, oil is located above the remote-controlled water vehicle, so that it makes sense to extract on the surface.

In another embodiment, the pump has a device for supplying water. If in part only highly viscous oil is conveyed, this can place a heavy load on the pump. While a larger volume flow is conveyed while simultaneously conveying water and oil, the effective viscosity, and hence the energy loss, can be reduced, however.

In another embodiment of the invention, the remote-controlled underwater vehicle has a rack. A rack is to be understood as a frame that surrounds the remote-controlled underwater vehicle, and for example consists of rods or tubes. At a comparatively low weight and good accessibility to all components, this rack provides protection for the remote-controlled underwater vehicle, since a potential collision will as a rule first impact the rack.

In another embodiment of the invention, the floatation panel consists of a foam. The advantage to foams is that they combine a low density and high stability. The foam especially preferably consists of a syntactic polyurethane.

In another embodiment of the invention, the drive means consists of at least one first thruster. The at least one first thruster is especially preferably arranged on the underside of the remote-controlled water vehicle. This makes it possible to minimize the probability that the at least one first thruster will come into contact with the oil.

In another embodiment of the invention, the drive means consists of at least one first thruster, wherein the at least one first thruster is vertically arranged to generate buoyancy or downward thrust.

In another embodiment of the invention, the drive means has a second thruster, wherein the second thruster is arranged horizontally to generate propulsion, and can be pivoted along a vertical axis.

In another alternative embodiment of the invention, the drive means has at least two second thrusters, wherein the at least two second thrusters are arranged horizontally to generate propulsion.

In another embodiment of the invention, the at least one pump is designed for separating oil and water. Centrifugal skimmer can be used for conveying and separation.

In another embodiment of the invention, the remote-controlled water vehicle has a device for separating oil and water. The device for separating oil and water preferably involves phase separation.

In another embodiment of the invention, the remote-controlled underwater vehicle is designed for dispensing a dispersant to fight the oil. The pump is here preferably designed both for extracting fluid and for ejecting the dispersant. In particular, the connection means has an additional supply line, which supplies the underwater vehicle with dispersant. An optional, interposed valve can be used to switch between the line for draining and supplying dispersant.

In another embodiment of the invention, the remote-controlled underwater vehicle has a preferably telescopic suction pipe arranged on the pump. Using a suction pipe makes it possible to increase the distance between the remote-controlled underwater vehicle and the ice, thereby reducing the risk of a collision. The risk of the drive means coming into contact with oil and thereby having its functionality impaired is also reduced.

In another embodiment of the invention, the remote-controlled underwater vehicle has a water jet lance. The water jet lance can be used to clear the ice from the underside, so as to make stuck or trapped oil accessible, more easily reachable and thus remove it.

In another embodiment of the invention, the remote-controlled underwater vehicle has a brush. This brush can be used to clear the ice from the underside, so as to remove stuck oil.

In another aspect, the invention relates to a system for extracting oil from the underside of a closed ice cover, consisting of a remote-controlled underwater vehicle according to the invention and a submarine, wherein the remote-controlled underwater vehicle is connected with the submarine by the connection means.

In another embodiment of the invention, the submarine has means for generating power, means for controlling the remote-controlled underwater vehicle, means for storing oil, means for locating oil, along with means for accommodating the remote-controlled underwater vehicle.

The advantage to such a system is that such a system can be quickly used for removing oil under ice. While the submarine can quickly submerge and reach the area of application, and has the necessary infrastructure devices, for example power generation and life support for the crew, the submarine can stay far enough away from the ice. The remote-controlled underwater vehicle can be deployed on site and moved to contaminated locations in a targeted manner. For this purpose, the submarine preferably locates potential areas with its means for locating oil, wherein these means preferably operate at a greater distance. For example, the latter preferably involves an acoustic Doppler current profiler. The means for storing oil of the submarine preferably take the form of a flexible container, which increases its volume when absorbing the oil or oil-water mixture. For example, the means for storing oil can have an overall capacity of 1,000 to 5,000 m$^3$. The submarine can have a device for separating oil and water.

In another embodiment of the invention, the system is designed for dispensing dispersant. For this purpose, the submarine has means for storing the dispersant. The dispersant can be dispensed either via the third connection for conveying extracted fluid or another connection for conveying the dispersant to the remote-controlled underwater vehicle.

Of course, the submarine can be designed to accommodate additional remote-controlled underwater vehicles.

In another aspect, the invention relates to a method for extracting oil from the underside of a closed ice cover. The method consists of the following steps:
a) Heading for the accident site lying under the closed ice cover with a submarine,
b) determining the rough position of the oil at the accident site with the submarine,
c) deploying a remote-controlled underwater vehicle according to the invention from the submarine,
d) approaching the rough position of the oil with the remote-controlled underwater vehicle,
e) determining the exact position of the oil with the remote-controlled underwater vehicle, approaching the exact position of the oil with the remote-controlled underwater vehicle,
g) extracting the oil with the remote-controlled underwater vehicle, transferring the oil to the submarine via the third connection for conveying extracted fluid and storing the oil,
h) retrieving the remote-controlled underwater vehicle with the submarine.

In another embodiment of the invention, the method additionally consists of the following step:
i) approaching a location for safely disposing of the collected oil.

In another alternative embodiment of the invention, the method additionally consists of the following steps:
j) depositing the accumulated oil in at least one suitable storage container on the ground,
k) waiting until the ice melts,
l) retrieving the at least one storage container with a surface vessel.

The advantage to this embodiment is that the quantity of cleaned oil is not limited by the capacity of the submarine. As a result, even larger contaminations can be eliminated more quickly. However, this method can only be used in areas that are not covered by ice year round. The storage container is preferably a deployable storage container, since this simplifies transport. The storage containers especially preferably have a deployable floatation unit. After the deployable floatation unit has been deployed, the storage containers surface, and can easily be received by a surface vessel. In this conjunction, receiving also encompasses towing.

In another embodiment of the invention, the surface of the ice can be cleaned before, during, after or while interrupting step g), for example by means of a brush or water jet lance, or by dispensing dispersant.

In another embodiment of the invention, steps d) to g) are repeated for various positions detected in step b).

FIG. 1 shows an exemplary remote-controlled underwater vehicle 10. The latter has first means for locating oil 20, for example a multibeam sonar, as well as second means for locating oil 22, for example a visual camera. The remote-controlled underwater vehicle 10 has headlamps 24 to illuminate the environment. The remote-controlled underwater vehicle 10 has a pump 30 to pick up oil. Floatation panels 40 generate a slight buoyancy for the remote-controlled underwater vehicle 10, so that the latter can be easily kept afloat or moved back and forth by means of the first thruster 60. Second thrusters 62 are used for moving in the horizontal plane. The remote-controlled underwater vehicle 10 is provided with a rack 50 arranged on the outside for stabilization and protection purposes.

Figure 2:
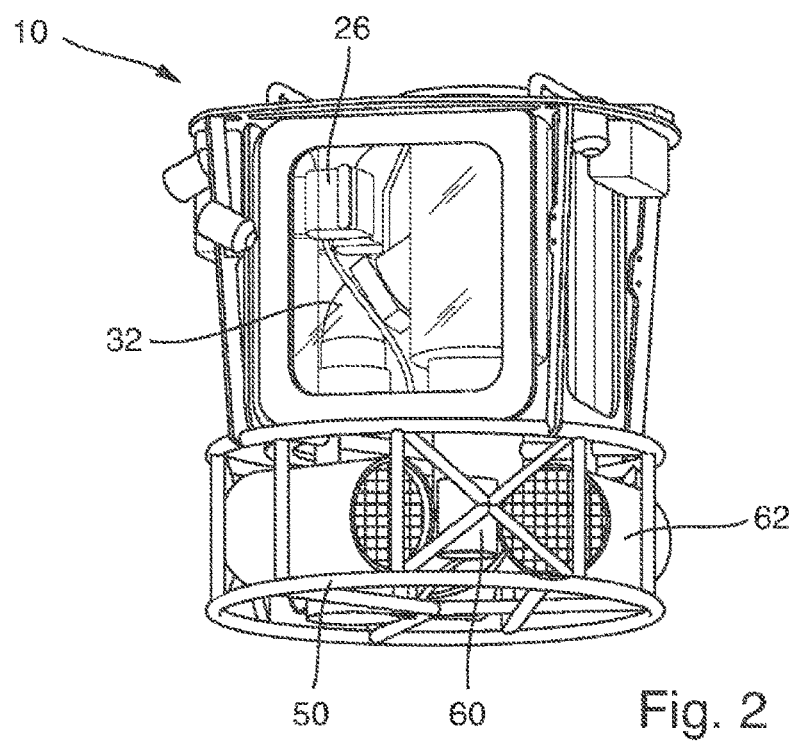
FIG. 2 is a semi-transparent perspective view of an example remote-controlled underwater vehicle.

FIG. 2 additionally shows evaluation electronics 26 for the means for locating oil as well as the third connection for conveying extracted fluid 32, by way of which the oil conveyed with the pump 30 is brought to the submarine (not depicted).

Figure 3:
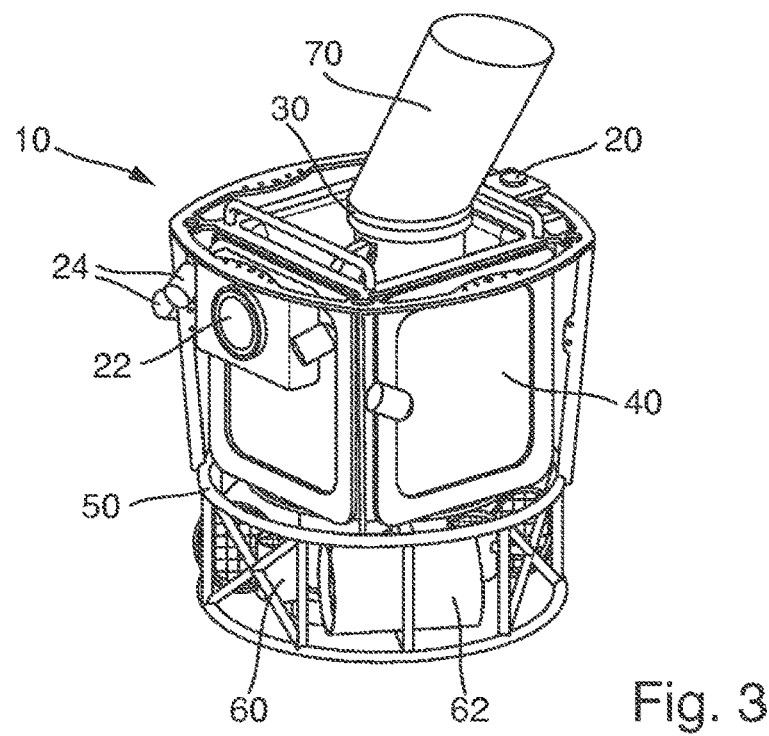
FIG. 3 is a perspective view of an example remote-controlled underwater vehicle with a suction pipe.

FIG. 3 shows the remote-controlled underwater vehicle 10 depicted on FIG. 1 with an additional suction pipe 70. The distance from the ice cover and oil can be increased by the suction pipe 70, which can reduce the probability of both a collision with the ice and a contamination of the first thruster 60 and second thruster 62 by the oil.

Figure 4:
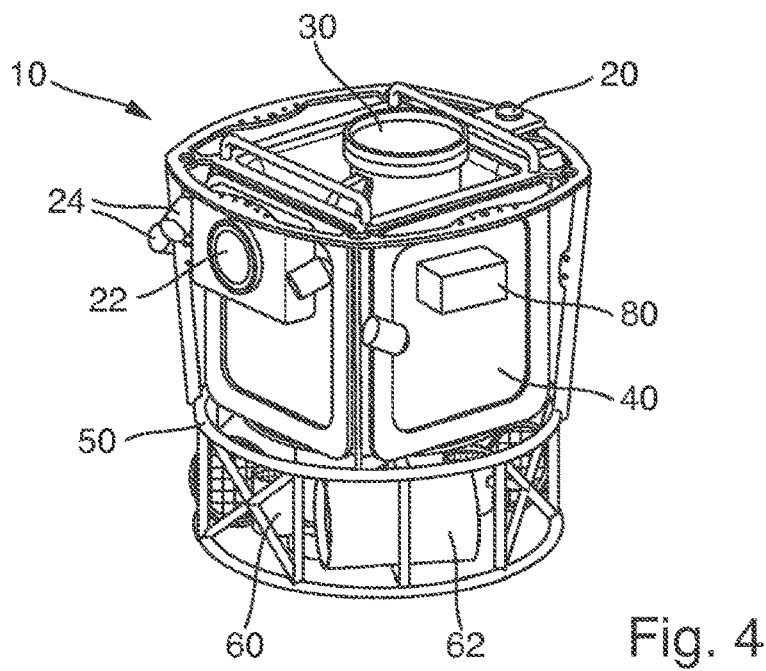
FIG. 4 is a perspective view of an example remote-controlled underwater vehicle with water jet lance.

FIG. 4 shows the remote-controlled underwater vehicle 10 depicted on FIG. 1 with an additional device for generating a water jet 80. The device for generating a water jet 80 generates a water jet (water jet lance), which can be used to additionally clean the underside of the ice.

Figure 5:
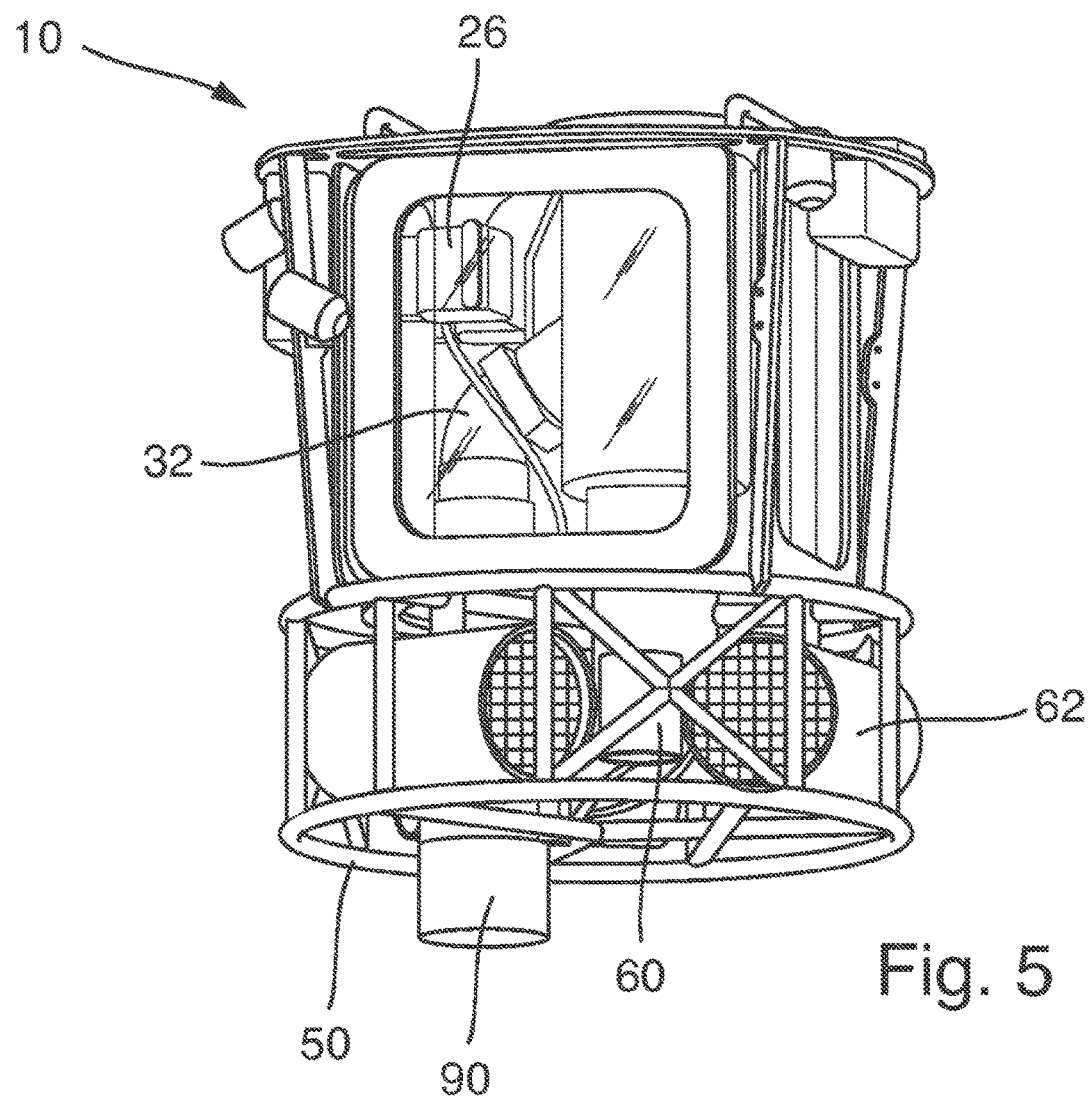
FIG. 5 is a semi-transparent perspective view of an example remote-controlled underwater vehicle with a separator.

FIG. 5 shows the remote-controlled underwater vehicle 10 depicted on FIG. 2 with an additional separator 90. The separator 90 is designed as a phase separator.

Figure 6:
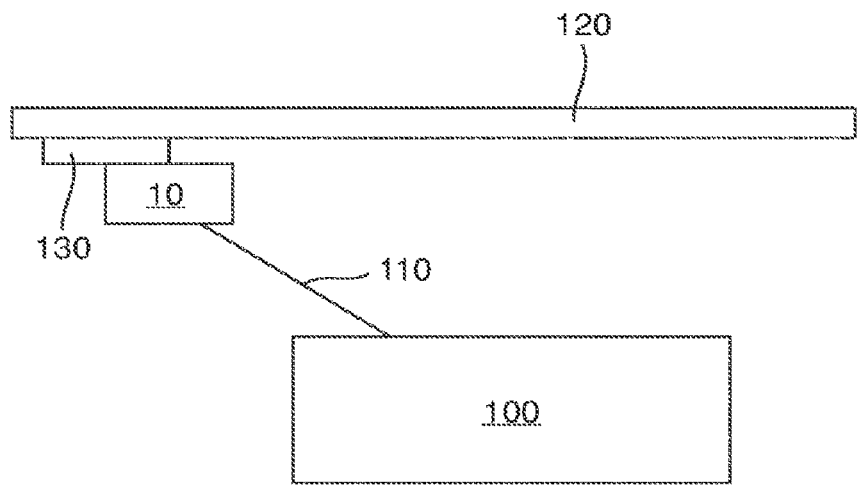
FIG. 6 is a schematic view of a submarine with an example remote-controlled underwater vehicle.

FIG. 6 shows a submarine 100, which is connected with the remote-controlled underwater vehicle 10 by a connection means 110. The remote-controlled underwater vehicle 10 removes oil 130, which has accumulated under the ice 120.

Figure 7:
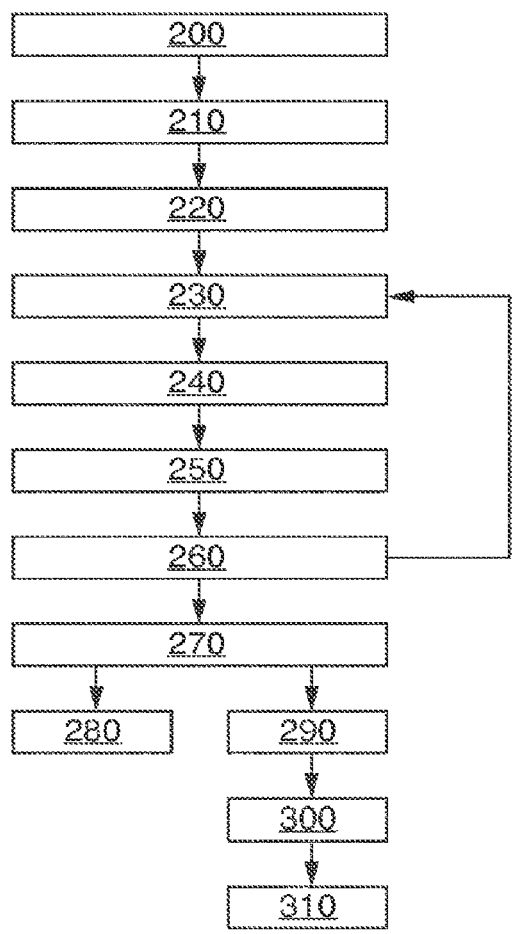
FIG. 7 is a schematic depiction of an example method for extracting oil from the underside of a closed ice cover.

FIG. 7 shows a method for extracting oil from the underside of a closed ice cover.

In step 200, the submarine heads for the accident site lying under the closed ice cover.

In step 210, the rough position of the oil at the accident site is determined with the submarine.

In step 220, the remote-controlled underwater vehicle is deployed from the submarine.

In step 230, the rough position of the oil is approached with the remote-controlled underwater vehicle.

In step 240, the exact position of the oil is determined with the remote-controlled underwater vehicle.

In step 250, the exact position of the oil is approached with the remote-controlled underwater vehicle.

In step 260, oil is extracted with the remote-controlled underwater vehicle, and transferred to the submarine via the third connection for conveying extracted fluid and storing the oil.

Steps 230 to 260 can be repeated.

In step 270, the remote-controlled underwater vehicle is retrieved with the submarine.

In an embodiment of the method, a location for safely disposing the collected oil is approached in step 280.

In another alternative embodiment of the method, the accumulated oil is deposited in at least one suitable storage container on the ground in step 290 and waited until the ice melts in step 300, and the at least one storage container is retrieved with a surface vessel in step 310.

REFERENCE LIST

10 Remote-controlled underwater vehicle
20 First means for locating oil

22 Second means for locating oil
24 Headlamp
26 Evaluation electronics
30 Pump
32 Third connection for conveying extracted fluid
40 Floatation panel
50 Rack
60 First thruster
62 Second thruster
70 Suction pipe
80 Device for generating a water jet
90 Separator
100 Submarine
110 Connection means
120 Ice
130 Oil
200 Step a)
210 Step b)
220 Step c)
230 Step d)
240 Step e)
250 Step f)
260 Step g)
270 Step h)
280 Step i)
290 Step j)
300 Step k)
310 Step l)

The invention claimed is:

1. A remote-controlled underwater vehicle for extracting oil from an underside of a closed ice cover, wherein the remote-controlled underwater vehicle has underwater buoyancy and comprises:
drive means;
a pump for extracting fluid;
means for locating oil;
means for connecting to a parent ship, the means for connecting having a first connection for communication, a second connection for supplying power to the remote-controlled underwater vehicle, and a third connection for conveying extracted fluid to the parent ship; and
a first floatation panel.

2. The remote-controlled underwater vehicle of claim 1 wherein the means for locating oil comprises sonar or multibeam sonar.

3. The remote-controlled underwater vehicle of claim 1 wherein the means for locating oil comprises an acoustic Doppler profiler.

4. The remote-controlled underwater vehicle of claim 1 wherein the means for locating oil comprises an infrared spectrometer.

5. The remote-controlled underwater vehicle of claim 1 wherein the means for locating oil comprises a visual camera.

6. The remote-controlled underwater vehicle of claim 1 wherein the means for locating oil comprises a gas chromatograph.

7. The remote-controlled underwater vehicle of claim 1 wherein the means for locating oil comprises a mass spectrometer.

8. The remote-controlled underwater vehicle of claim 1 wherein the means for locating oil is a first means for localizing oil, the remote-controlled underwater vehicle comprising a second means for locating oil, wherein the first and second means for locating oil are selected from a group consisting of sonar, multibeam sonar, an acoustic Doppler current profiler, an infrared spectrometer, a visual camera, a gas chromatograph, and a mass spectrometer, wherein the first means for locating oil is different than the second means for locating oil.

9. The remote-controlled underwater vehicle of claim 1 wherein the drive means comprises a first thruster.

10. The remote-controlled underwater vehicle of claim 9 wherein the first thruster is disposed vertically to generate buoyancy or downward thrust.

11. The remote-controlled underwater vehicle of claim 9 wherein the drive means comprises at least two second thrusters, which at least two second thrusters are disposed horizontally to generate propulsion.

12. The remote-controlled underwater vehicle of claim 1 wherein the pump for extracting fluid separates oil and water.

13. A system for extracting oil from an underside of a closed ice cover, the system comprising:
a submarine; and
a remote-controlled underwater vehicle connected with the submarine, wherein the remote-controlled underwater vehicle has underwater buoyancy and comprises:
drive means,
a pump for extracting fluid,
means for locating oil,
means for connecting to the submarine, the means for connecting having a first connection for communication, a second connection for supplying power to the remote-controlled underwater vehicle, and a third connection for conveying extracted fluid to the submarine; and
a first floatation panel.

14. The system of claim 13 wherein the submarine comprises:
means for generating power;
means for controlling the remote-controlled underwater vehicle;
means for storing oil;
means for locating oil; and
means for receiving the remote-controlled underwater vehicle.

15. A method for extracting oil from an underside of a closed ice cover, the method comprising:
(a) heading to an accident site laying under the closed ice cover with a submarine;
(b) determining a position of the oil at the accident site with the submarine;
(c) deploying a remote-controlled underwater vehicle having underwater buoyancy from the submarine, wherein the remote-controlled underwater vehicle comprises:
drive means,
a pump for extracting fluid,
means for locating oil,
means for connecting to a parent ship, the means for connecting having a first connection for communication, a second connection for supplying power to the remote-controlled underwater vehicle, and a third connection for conveying extracted fluid to the parent ship, and
a first floatation panel;
(d) approaching the position of the oil with the remote-controlled underwater vehicle;
(e) determining a more-precise position of the oil with the remote-controlled underwater vehicle;
(f) approaching the more-precise position of the oil with the remote-controlled underwater vehicle;

(g) extracting the oil with the remote-controlled underwater vehicle;
(h) transferring the oil to the submarine via the third connection for conveying extracted fluid;
(i) storing the oil; and
(j) retrieving the remote-controlled underwater vehicle with the submarine.

16. The method of claim 15 comprising approaching a location for disposing of the oil that has been extracted and stored.

17. The method of claim 15 wherein determining the position of the oil at the accident site with the submarine in step (b) comprises determining a first position of the oil and a second position of the oil, wherein the method comprises performs performing steps (d) through (i) with respect to the first and second positions.

\* \* \* \* \*